(12) United States Patent
McCahon et al.

(10) Patent No.: US 7,277,460 B1
(45) Date of Patent: *Oct. 2, 2007

(54) GENERATION OF OPTICAL FILAMENTS BY USE OF LOCALIZED OPTICAL INHOMOGENEITIES

(75) Inventors: Stephen William McCahon, Tucson, AZ (US); Paul B. Lundquist, Tucson, AZ (US)

(73) Assignee: Ionatron, Tucson, AZ (US)

( * ) Notice: Subject to any disclaimer, the term of this patent is extended or adjusted under 35 U.S.C. 154(b) by 294 days.

This patent is subject to a terminal disclaimer.

(21) Appl. No.: 10/640,336

(22) Filed: Aug. 14, 2003

(51) Int. Cl.
*H01S 3/10* (2006.01)
(52) U.S. Cl. .............................. 372/9; 372/23; 372/109
(58) Field of Classification Search ................... 372/21
See application file for complete search history.

(56) References Cited

U.S. PATENT DOCUMENTS

| | | | |
|---|---|---|---|
| 3,775,638 A * | 11/1973 | Tidman | 315/36 |
| 4,201,559 A * | 5/1980 | Rittler | 65/441 |
| 5,394,411 A * | 2/1995 | Milchberg et al. | 372/5 |
| 6,203,864 B1 * | 3/2001 | Zhang et al. | 427/592 |
| 7,050,469 B1 * | 5/2006 | Lundquist et al. | 372/9 |
| 2004/0135998 A1 | 7/2004 | Chin | |

OTHER PUBLICATIONS

V. Sharka, et al., "Evolution of singular optical pulses towards vortex solitons and filamentation in air," ©2003 Elsevier B. V., Physics Letters, A, vol. 319, pp. 317-324, Dec. 8, 2003.

C. T. Law, et al., "Waveguiding properties of optical vortex solitons," ©2000 Optical Society of America, Optics Letters, vol. 25, No. 1, pp. 55-57, Jan. 1, 2000.

D. Mihalache, et al., "Stable three-dimensional spinning optical solitons supported by competing quadratic and cubic nonlinearities," arXiv:nlin.PS/0206007 v1, Jun. 7, 2002.

M. Mlejnek, et al., "Dynamic spatial replenishment of femtosecond pulses propagating in air," ©1998 Optical Society of America, Optics Letters, vol. 23, No. 5, pp. 382-384, Mar. 1, 1998.

M. Mlejnek, et al., "Optically turbulent femtosecond light guide in air," ©1999 The American Physical Society, Physical Review Letters, vol. 83, No. 15, pp. 2938-2941, Oct. 11, 1999.

J. V. Moloney, et al., "Femtosecond self-guided atmospheric light strings," ©2000 American Institute of Physics, Chaos, vol. 10, No. 3, pp.—559-569, Sep. 2000.

C. Day, "Experiments detail how powerful ultrashort laser pulses propagate through air," Physics Today Reference, p. 22, Jan. 1998.

Z. S. Sacks, et al., "Holographic formation of optical-vortex filaments," ©1998 Optical Society of America, J. Opt. Sc. Am. B., vol. 15, No. 8, pp. 2226-2234, Aug. 1998.

(Continued)

*Primary Examiner*—Minsun Oh Harvey
*Assistant Examiner*—Tod T. Van Roy
(74) *Attorney, Agent, or Firm*—Blank Rome LLP

(57) ABSTRACT

Optical filaments are formed controllably in a gaseous medium such as air. A phase plate introducing a phase discontinuity or other localized optical inhomogeneity is introduced into the path of the pulsed high-power laser beam that forms the optical filaments in the medium. The locations and characteristics of the phase discontinuities or singularities are selected to control the number and locations of the optical filaments.

16 Claims, 3 Drawing Sheets

OTHER PUBLICATIONS

G. A. Swartzlander, Jr., et al., "Optical Vortex Solitons Observed in Kerr Nonliner Media," ©1992 The American Physical Society, Physical Review Letters, vol. 69, No. 17, pp. 2503-2506, Oct. 26, 1992.

Jens Schwartz, et al., "Analytical solution for uv filaments," ©2001 The American Physical Society, Physical Review A, vol. 65, pp. 013806-1-013806-10, Dec. 5, 2001.

P. Sprangle, et al., "Propagation of intense short laser pulses in the atmosphere," ©2002 The American Physical Society, Physical Review E 66, vol. 66, pp. 046418-1-046418-21, Oct. 30, 2002.

S. Tzortzakis, et al. "Breakup and fusion of self-guided femtosecond light pulses in air," ©2001 The American Physical Society, Physical Review Letters, vol. 86, No. 24, pp. 5470-5473, Jun. 11, 2001.

X. Mi. Zhao, et al. "Femtosecond ultraviolet laser pulse induced lightning discharges in gases," ©1995 IEEE, Journal of Quantum Electronics, vol. 31, No. 3, pp. 599-612, Mar. 1995.

S. Tzortzakis et al, "Long connected plasma channels in air produced by ultrashort UV laser pulses," ©1999 Optical Society of America, oral paper, http://pclasim47.univ-lyon1.fr/publications/cleo2000uv.pdf.

J. Yu et al, "Backward supercontinuum emission from a filament generated by ultrashort laser pulses in air," *Optics Letters*, vol. 26, No. 8, Apr. 15, 2001, pp. 533-535.

"Transient Microphotospectrometer," Nov. 7, 2000, http://www.esrf.fr/exp_facilities/ID9/spectro.html.

Braun, et al., "Self-channeling of high-peak-power femtosecond laser pulses in air", Jan. 1, 1995. No. 1, Optics Letters.

* cited by examiner

GENERATION OF OPTICAL FILAMENTS BY USE OF LOCALIZED OPTICAL INHOMOGENEITIES

FIELD OF THE INVENTION

The present invention is directed to the generation of optical filaments and more particularly to spatial control over the generation of optical filaments.

DESCRIPTION OF RELATED ART

An optical filament is a non-diffracting optical beam that can propagate over relatively long distances through a medium that possesses the appropriate nonlinear optical responses. When a beam of intense light passes through such a medium, the medium tries to focus the light. If the beam is focused to a sufficient degree, the intensity becomes extremely high, with the result that the medium starts to ionize. The resulting plasma tends to defocus the beam. A balance between the focusing and defocusing effects results in the optical filament. The threshold power for forming an optical filament is typically in the tens of megawatts.

Normal atmosphere contains such optical nonlinearities, as do many other substances. Optical filaments have applications such as laser-controlled discharges, long-range deposition of high laser intensities, and LIDAR monitoring.

The formation of optical filaments extending over several meters has been reported. However, to date, no reliable method has been developed or disclosed for controlling the formation of one or more optical filaments within a filament forming laser beam. Though the number of filaments could be somewhat controlled by the amount of energy in the beam, the transverse position(s) of filament(s) relative to the beam and the relative positions between multiple filaments could not be controlled. It was generally believed that intensity fluctuations across the beam seeded the formation of filaments in a random manner.

There is general speculation by several experimentalists that diffraction from hard edges in an optical system seeds filament formation. However, controllable filament generation on that basis has not been achieved.

SUMMARY OF THE INVENTION

It will be readily apparent from the above that a need exists in the art for a way to control the formation of optical filaments in air or another gaseous medium.

It is therefore an object of the invention to control the formation of one or more optical filaments within the filament forming laser beam.

It is a further object of the invention to control the locations of the optical filaments.

It is a still further object of the invention to control, in a deterministic manner, the total number of optical filaments generated and their spatial positions of origin.

It is a still further object of the invention to do so without relying solely on the energy of the beam or on intensity fluctuations.

It is a still further object of the invention to provide energenically efficient generation of filaments.

It is a still further object of the invention to generate filaments that are robust to atmospheric turbulence.

To achieve the above and other objects, the present invention is based on the inventors' discovery that filaments are formed from localized optical inhomogeneities, such as optical phase discontinuities and singularities, in the wave front. A phase plate can be generated to place optical phase singularities at specific locations in the beam. This allows the generation of specifically designed patterns of filaments in air or another gaseous medium within a beam.

The laser beam is an intense, pulsed laser beam having a high peak power, typically around five terawatts.

The preferred embodiment uses an array or pattern of phase discontinuities that in turn generate an array or pattern of filaments. Furthermore, higher order phase singularities can affect the properties of the filament once formed. Thus, control of the filament formation and their related properties once formed is accomplished using phase discontinuities.

A proof of principle demonstration was constructed that consisted of an array of scribed lines on a glass microscope slide. Intersections of the scribed lines provided for phase discontinuities. The scribed glass was placed within the laser beam before any filament formation could occur. The filaments formed in an array, that corresponded to the scribed array, at a plane approximately 10 feet from the scribed array.

A phase discontinuity in the middle of the filament increases the stability of the filament to phase changes in the air or other gaseous medium. Such phase changes can be caused, e.g., by air turbulence.

The discontinuity plate can be reflective or transmissive.

BRIEF DESCRIPTION OF THE DRAWINGS

A preferred embodiment will be set forth in detail with reference to the drawings, in which.

DETAILED DESCRIPTION OF THE PREFERRED EMBODIMENT

Figure 1:
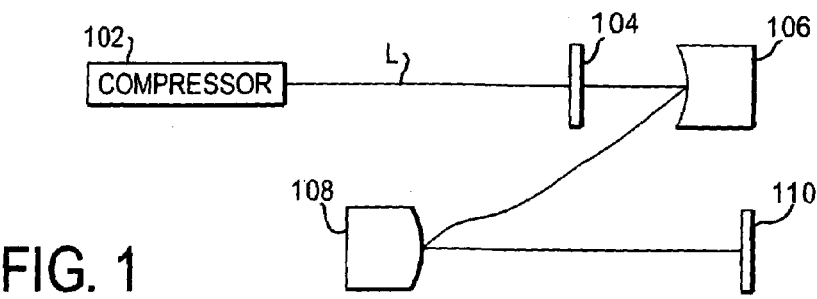
FIG. 1 shows an experimental setup for creating filaments according to the preferred embodiment.

A preferred embodiment of the present invention will now be set forth in detail with reference to the drawings, in which like reference numerals refer to like elements throughout.

In the preferred embodiment, a phase discontinuity was used to create filaments in a controlled manner. The experimental setup is shown in FIG. 1, in which a compressor 102 emits an 800 nm laser beam L that passes through a discontinuity plate 104 and is collimated by collimating mirrors 106 (concave, R=2 m) and 108 (convex, R=1.5 m) before being made incident on a sheet of laser alignment paper 110 in a burn pattern plane.

Figure 2:
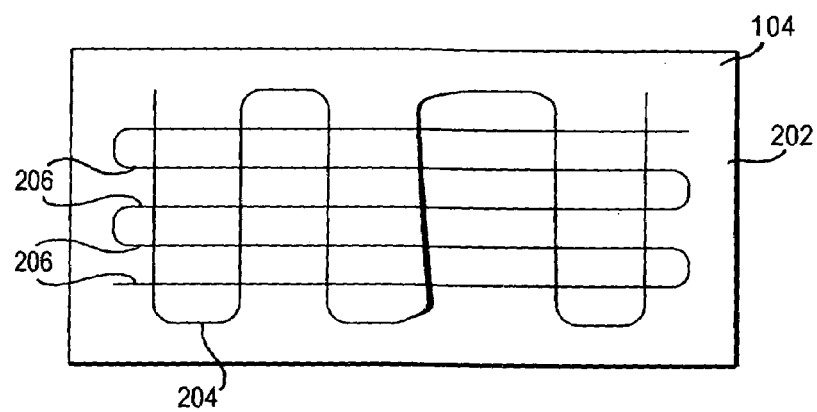
FIG. 2 shows a pattern of scribed lines on the phase discontinuity plate used in FIG. 1.

The discontinuity plate 104 is shown in detail in FIG. 2. As shown, the discontinuity plate 104 is formed on a substrate such as a microscope slide 202. A pattern of scribed lines 204 is formed on the microscope slide 202. The pattern can be any suitable pattern determined by the arrangement of filaments desired to be formed and the mechanism for forming the scribed lines 204 on the microscope slide 202. The scribed lines 204 intersect at intersection points 206 and thereby form phase discontinuities at those intersection points 206.

Figure 3:
FIGS. 3 and 4 show burns left on laser alignment paper by optical filaments formed in the setup of FIG. 1.
Figure 4:

Typical burn patterns from a collimated laser beam, ~130 fs pulse, 800 nm wavelength, and 450 mJ/pulse energy, are shown in FIGS. 3 and 4. The array pattern is clearly visible and closely matches the scribed array. The pattern is very repeatable and stationary. The pattern indicates that the filaments form at the intersections 206 of the scribed lines 204.

Figure 5:
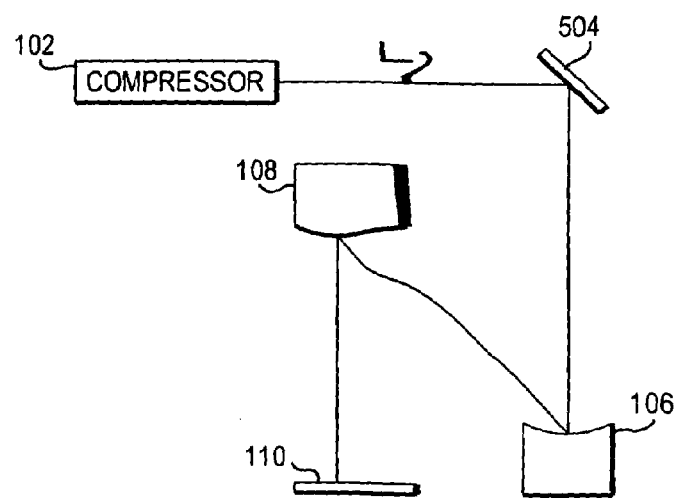
FIG. 5 shows a setup with a reflective phase discontinuity plate.

The discontinuity plate 104 has been disclosed as transmissive. However, as shown in FIG. 5, a reflective discontinuity plate 504 can be used instead.

While a preferred embodiment has been set forth above, those skilled in the art who have reviewed the present disclosure will readily appreciate that other embodiments can be realized within the scope of the invention. For example, a phase plate can impart a combination of singularities and discontinuities. Further, a phase singularity or discontinuity can be created in any suitable way, e.g., by varying the index of refraction of the material of the phase plate. Also, a plate can be used to impart other localized optical inhomogeneities. Moreover, disclosures of numerical values and the like are illustrative rather than limiting. Therefore, the present invention should be construed as limited only by the appended claims.

We claim:

1. A method for forming at least one optical filament in a gaseous medium, the method comprising:
    (a) generating a pulsed laser beam having an optical path that takes the laser beam through the medium;
    (b) providing, in the optical path, an optical element having at least one localized optical inhomogeneity such that the at least one localized optical inhomogeneity is in the optical path; and
    (c) passing the pulsed laser beam through the medium downstream in the optical path from the optical element such that the at least one optical filament is formed in accordance with the at least one localized optical inhomogeneity.

2. The method of claim 1, wherein the optical element has a plurality of the localized optical inhomogeneities selected in accordance with a desired number and lateral spacing of a plurality of the optical filaments to be formed.

3. The method of claim 1, wherein the at least one localized optical inhomogeneity comprises at least one phase discontinuity.

4. The method of claim 3, wherein the optical element has a plurality of the phase discontinuities selected in accordance with a desired number and lateral spacing of a plurality of the optical filaments to be formed.

5. The method of claim 4, wherein the optical element comprises a substrate, and wherein the plurality of phase discontinuities are formed by a scribed pattern on the substrate.

6. The method of claim 5, wherein the scribed pattern comprises a pattern of scribed lines that define intersection points, and wherein the phase discontinuities are located at the intersection points.

7. The method of claim 1, wherein the optical element is transmissive.

8. The method of claim 1, wherein the optical element is reflective.

9. An apparatus for forming at least one optical filament in a gaseous medium, the apparatus comprising:
    a laser source for generating a pulsed laser beam having an optical path, the laser source being positionable relative to the medium such that the optical path takes the laser beam through the medium; and
    an optical element, disposed in the optical path, having at least one localized optical inhomogeneity such that the at least one localized optical inhomogeneity is in the optical path.

10. The apparatus of claim 9, wherein the optical element has a plurality of the localized optical inhomogeneities selected in accordance with a desired number and lateral spacing of a plurality of the optical filaments to be formed.

11. The apparatus of claim 9, wherein the at least one localized optical inhomogeneity comprises at least one phase discontinuity.

12. The apparatus of claim 11, wherein the optical element has a plurality of the phase discontinuities selected in accordance with a desired number and lateral spacing of a plurality of the optical filaments to be formed.

13. The apparatus of claim 12, wherein the optical element comprises a substrate, and wherein the plurality of phase discontinuities are formed by a scribed pattern on the substrate.

14. The apparatus of claim 13, wherein the scribed pattern comprises a pattern of scribed lines that define intersection points, and wherein the phase discontinuities are located at the intersection points.

15. The apparatus of claim 9, wherein the optical element is transmissive.

16. The apparatus of claim 9, wherein the optical element is reflective.

* * * * *